Aug. 29, 1933.  P. WEBER  1,924,339
INCLINOMETER
Filed Nov. 3, 1930   2 Sheets-Sheet 1

INVENTOR
Philip Weber
BY
ATTORNEY

Aug. 29, 1933.  P. WEBER  1,924,339
INCLINOMETER
Filed Nov. 3, 1930   2 Sheets-Sheet 2

INVENTOR
Philip Weber.
BY
ATTORNEY

Patented Aug. 29, 1933

1,924,339

UNITED STATES PATENT OFFICE 1,924,339

INCLINOMETER

Philip Weber, Monmouth Beach, N. J., assignor to Pioneer Instrument Company, Incorporated, Brooklyn, N. Y., a Corporation of New York Application November 3, 1930. Serial No. 493,174

6 Claims. (Cl. 33—220)

The present invention relates to means for indicating longitudinal inclinations of a mobile object, and more particularly to devices employing gravitational effects for producing the indications.

In indicating devices of the above type, gyroscopic means are generally employed for overcoming the effect of acceleration forces on the gravitational element by utilizing the precessional forces of a gyroscope to balance or counteract the effect of said acceleration forces. It has been found, however, that when such devices are employed on aircraft for example, the indications produced are inaccurate due to the fact that the acceleration in descent due to an inclination downward from level flight at normal cruising speeds is greater than the deceleration in ascent due to an inclination upward from level flight at the same cruising speeds and therefore a greater balancing force is required for the same angle of inclination in descent than in ascent.

It is one of the objects of the present invention to provide a novel indicating device of the above type wherein accurate indications are produced regardless of whether an aircraft, for example, on which the device is mounted is moving upward or downward.

Another object is to provide an inclinometer wherein the same indication is produced for an angle of inclination downward as for the same angle of inclination upward when the plane inclines downward or upward from level flight while flying at its normal cruising speed.

Another object is to provide in an inclinometer of the type employing gyroscopic means for balancing the effects of acceleration, novel means whereby a balancing force is produced in greater proportion for an angle of inclination downward and in lesser proportion for the same angle of inclination upward, so that equal indications are produced for the same angle of inclination in descent as in ascent of the aircraft on which the inclinometer is employed.

A further object is to provide in an inclinometer of the above type, novel means whereby the gravitational element is moved in a direction opposite to the acceleration forces to a greater extent in descent than in ascent for the same angle of inclination, so that equal indications are produced which are true indications of said angle.

A still further object is to provide in an inclinometer of the above type, novel motion-transmitting means whereby the motion transmitted from the gravitational element to the indicating element is the resultant of the motions of the gravitational element due to gravity, acceleration, and gyroscopic precession and the resultant motion produced in descent is equal to the resultant produced in ascent for the same angle of inclination.

The above and other objects and advantages of the invention will appear more fully hereinafter from a consideration of the detailed description which follows, together with the accompanying drawings, wherein is illustrated one embodiment of the invention. It is to be expressly understood, however, that the drawings are for the purpose of illustration and description only, and are not designed as a definition of the limits of the invention, reference being had for this purpose to the appended claims.

In the drawings, wherein like reference characters refer to like parts throughout the several views, Fig. 1 is a partial longitudinal section of one form of the device embodying the present invention;

Figure 1:
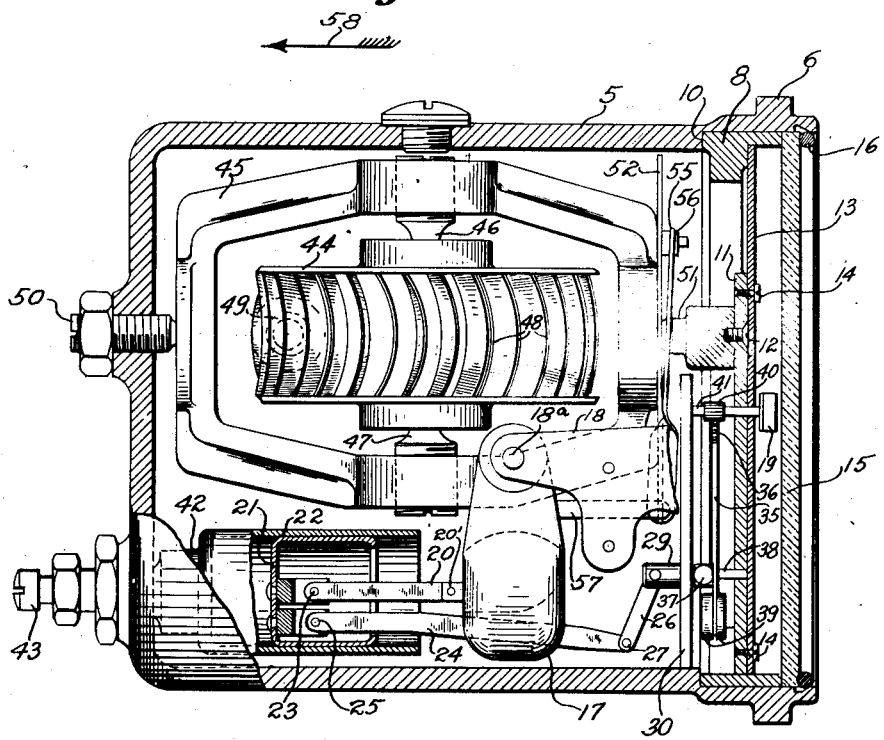
Figure 2:
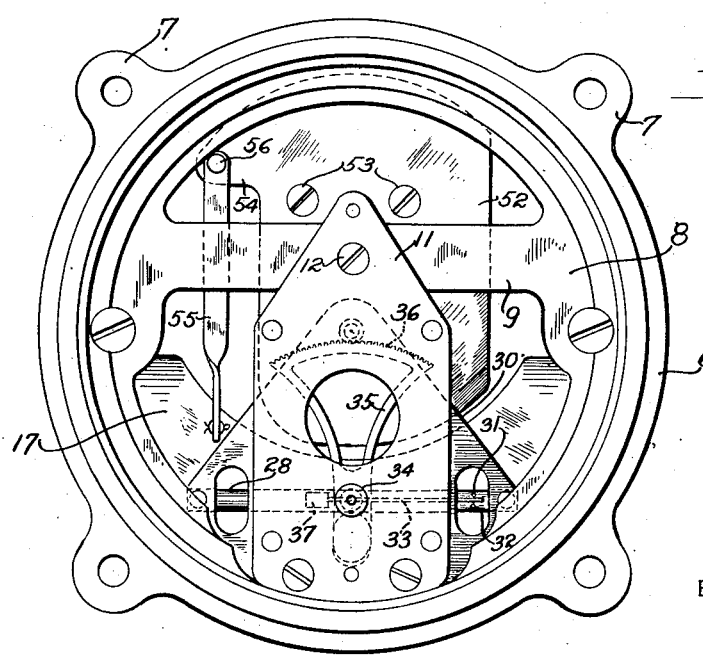
Fig. 2 is a right end view of Fig. 1, with the cover-glass, indicator, and dial removed.

Referring to the drawings, and more particularly to Figs. 1 and 2, the device embodying the invention is of the type wherein a gravitational element, such as a simple pendulum for example, is suspended and arranged to swing on a transverse axis of the mobile object whose longitudinal inclination is to be indicated.

In the form shown, the device comprises a suitable casing 5 provided with a peripheral flange 6 at the front end thereof having projections or ears 7 whereby the device may be mounted on an instrument panel by any suitable means, such as bolts or screws (not shown). A supporting member 8 in the form of a ring having an integral cross-bar 9 is provided at the front end of the casing and adapted to abut a circumferential wall 10 provided on the interior of the casing. A plate 11 is secured to said supporting member by suitable means, such as screws 12, which are countersunk so that a dial 13 may be secured thereto, as by means of screws 14. A cover 15 of some suitable transparent material, such as glass or celluloid, is provided for closing the casing and through which the dial is adapted to be viewed, said cover-glass being held in position by means of a clamping ring 16. A gravitational element in the form of a simple pendulum 17 is suspended within the casing at 18a as by means of a bracket 18, the axis of suspension being transverse of the aircraft on which the device is mounted, thereby permitting a longitudinal swing of the pendulum 17 when the aircraft is inclined downward as in descent or inclined upward as when climbing.

Means are provided for transmitting the swing of the pendulum 17 to a pointer 19, the latter being positioned in front of the dial 13 for traversing a suitable scale (not shown) marked on said dial, and in the form shown said means comprise a rod 20, one end of which is secured to the pendulum 17 by means of a loose pin connection 20' and the other end of which is secured to a piston member 21 of a dash-pot 22 also by means of a loose pin connection 23. Another rod 24 has one end thereof secured to the piston member 21 by means of a tight pin connection 25 and the other end pivotally connected to a link member 26 as indicated at 27. The link member 26 is secured to or made integral with a rocking shaft 28 extending transversely of the casing and suitably journaled at its ends in projecting members 29 secured to or made integral with a plate 30.

Pins 31 and 32 are provided at one end of the rocking shaft 28 between which is adapted to extend one end of a rod 33, the latter passing through a pivot member 34 made integral with or secured to a gear sector 35 provided with gear teeth 36. The other end of the rod 33 is provided with a counterweight 37. Gear sector 35 is journaled in the plate 11 by means of a pin 38 and is also provided at the lower end with a counterweight 39 for urging the sector to normal position. The gear teeth 36 are arranged to mesh with a pinion 40 which is integral with a shaft 41 journaled in the plates 30 and 11, one end of the shaft extending through the plate 11 and through the dial 13 and to which is secured the pointer 19.

The dash-pot 22 is connected with the atmosphere outside the casing by means of a valve 42 arranged to be adjusted by means of a screw 32, and by means of the loose pivotal connections between the piston and the pendulum serves to prevent any vibrations of the latter from being transmitted to the pointer. The pointer is not actuated until a positive motion is transmitted to the piston by the pendulum.

It will be apparent from this construction that when the pendulum 17 swings to the left or to the right as viewed in Fig. 1 due to an inclination of the casing downward or upward, respectively, piston member 21 will be moved either to the left or to the right, causing rod 24, by means of its connection 25, to actuate the lever 26 through the pivot connection 27. Actuation of the lever 26 will cause rotation of the shaft 28 in its journal members 29 and produce an arcuate movement of the pins 31 and 32 upward or downward. Movement of the pins 31 and 32 will in turn swing the rod 33 in its pivot 34, thereby causing an angular movement of the gear sector 35, thus rotating the pinion 40 and moving the pointer 19 across the dial 13.

As hereinbefore stated, gyroscopic means are provided for counteracting the effect of acceleration forces on the pendulum 17, and in the form shown comprise a rotor 44 mounted in the frame 45 as by means of pivot pins 46 and 47, on which it is adapted to rotate. The rotor is provided with a series of peripheral buckets 48 which cause it to rotate when a stream of air is directed thereon as by means of a nozzle 49. It is obvious that a suitable electric drive may be provided instead of the pneumatic drive if desired.

Frame 45 is pivotally mounted, as by means of pivot pins 50 and 51 for rotation about the longitudinal axis of the casing 5, and hence of the craft on which the instrument is mounted, due to precessional forces of the rotor 44 acting thereon when the latter is turned about an axis perpendicular to its axis of rotation and perpendicular to the axis passing through the pivot pins 50 and 51.

It is well known in the art that a gyroscope rotated at high speed and then turned bodily will precess and tend to establish its axis of rotation parallel to the axis of turning. Hence, in Fig. 1, if the casing 5 be inclined upward or downward, the rotor 44 will be turned clockwise or counter-clockwise about an axis perpendicular to the axis of rotation and the longitudinal axis passing through pins 50 and 51, and due to this rotation, precession will take place, tending to establish the axis of rotation parallel to the axis of turning, thereby causing rotation of the frame 45 about the longitudinal axis passing through pins 50 and 51.

Means are provided for transmitting this precessional motion of the frame 45 to the pendulum 17, and in the form shown comprise a plate 52 secured to the gyroscope frame 45 in any suitable manner, as by means of screws 53 and arranged to rotate with said frame about the longitudinal axis of the latter. The plate is provided with a projecting portion 54 to one end of which is pivotally secured a rod 55 as indicated at 56, the other end of the rod being pivotally connected to a projecting member 57, which in turn is rigidly secured to the pendulum 17. It will be seen that rotation of the frame 45 on its pivot pins 50 and 51 due to precession of the rotor will be transmitted through the plate 52 and the connecting link or rod 55 to the pendulum 17.

Figure 3:
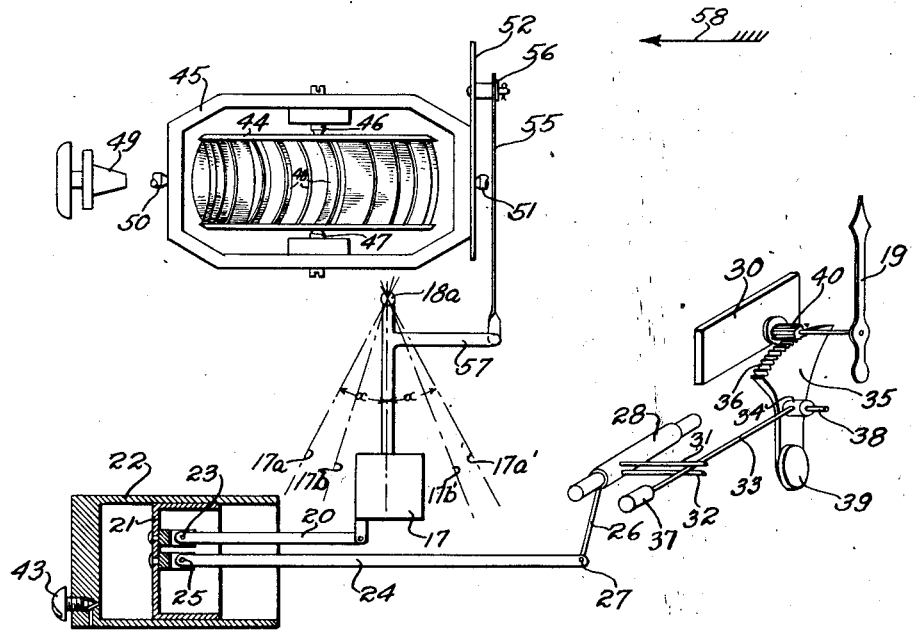
Fig. 3 is a diagrammatic view illustrating the principle of operation of the apparatus embodying the invention.

Referring to Figs. 1 and 3, the gyroscope is so arranged that when the direction of flight of the craft on which the indicating device is mounted is in the direction shown by the arrow 58, and the craft inclines downward as in descending, precession of the rotor 44 will be in such a direction as to cause movement of the pendulum 17 in the same direction as the swing thereof due to gravity, in this instance to the left, since the acceleration forces due to the speeding-up of the craft in descent are to the right—in other words, precessional movement is in the direction opposite to the movement produced by the force of acceleration—thereby balancing or neutralizing the latter so that the pendulum 17 will assume a substantially vertical position such as it would assume if only gravity were acting thereon and no acceleration forces were present, thereby giving a true indication of the angle of inclination on the dial 13 by means of the pointer 19.

Figure 4:
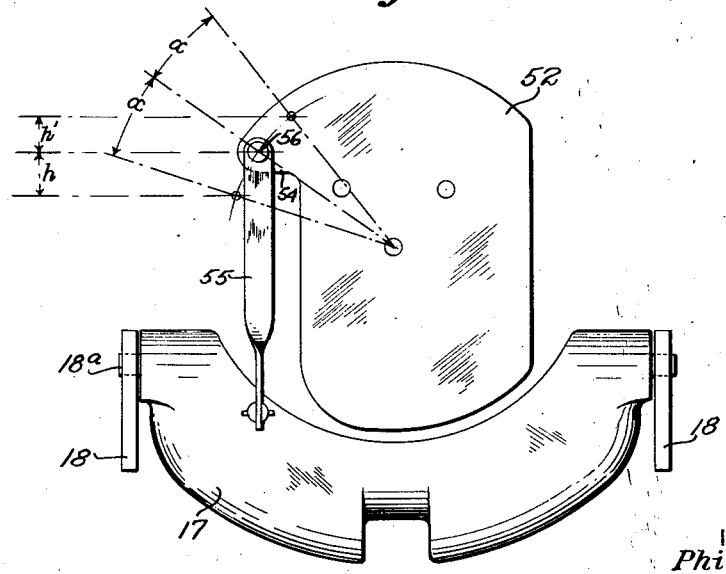
Fig. 4 is a front elevation of one form of motion-transmitting mechanism employed.

When an aircraft is flying level at a normal cruising speed and tends to incline downward or upward from such level flight due to disturbing influences, the rate of change of speed of the craft in moving downward is greater than said rate when moving upward or climbing without any change in throttle setting; therefore the accelerating force acting on the pendulum is greater when the craft is inclined at a certain angle downward than when inclined at the same angle upward. It is therefore desirable that, for the same angle of precession of the frame 45 in either direction about pins 50 and 51, a larger motion be imparted to the pendulum 17 in a direction opposite to the motion produced by the acceleration in descent due to a downward inclination from level flight at normal cruising speeds than when the craft is ascending or climbing at the same angle due to an upward inclination from such level flight. To this end, the pivot connection 56 of the rod 55 (referring to Fig. 4) is selected at such a point on the rotary plate 52 that for the same angle of precession (as indicated by α) in a counter-clockwise direction, point 56 will move a greater vertical distance $h$ than in a counter-clockwise direction as indicated by $h'$, it being understood that plate 52 moves counter-clockwise for descent, thereby imparting greater motion to the pendulum, and clockwise in ascent, thereby imparting a lesser motion to the pendulum.

Referring to Fig. 3, the operation of the device is as follows: Assuming the direction of flight at normal cruising speed to be that indicated by the arrow 58 and the craft is flying level without acceleration, the pendulum 17 will remain in the position indicated in full lines. However, when the craft inclines downward at a certain angle in descending without changing the throttle setting of the engine, the pendulum would assume the position indicated in dotted lines at 17a, if there were no forces of acceleration present. It is obvious, though, that when an aircraft is descending it begins to accelerate due to gravity acting thereon in addition to its own power of propulsion and therefore the pendulum tends to move only to the position indicated in dotted lines at 17b, but on inclination of the aircraft, which constitutes a turning about the transverse axis thereof, the gyroscope precesses through an angle equal to the angle of inclination and therefore imparts a motion to the pendulum through the plate 52 and its cooperating linkage, to overcome said tendency, whereby the pendulum may move to the proper position indicated at 17a. On the other hand, when the aircraft is inclined upward, as in climbing, the pendulum 17 takes the position as indicated in dotted line at 17a' for the same angle of inclination but, due to a load on the engine in propelling the craft against the force of gravity without materially increasing the engine speed, deceleration takes place, and the force of the deceleration tends to move the pendulum to the position 17b'. The gyroscope now precesses in the opposite direction, thereby causing the pendulum to assume the position 17a', which is the true position for the angular inclination. It will be noted, however, that the angular distance between 17a and 17b is greater than between 17a' and 17b', the difference between the two being compensated for by the selected location of the pivot point 56 shown in Fig. 4, as explained hereinbefore. It will thus be seen that the forces of acceleration and deceleration acting upon the pendulum are compensated for or neutralized, thereby causing the latter to assume the proper position for any angle of inclination and thus producing a corresponding indication on the dial by means of the pointer, which is actuated by the pendulum.

There is thus provided an inclinometer which is comparatively simple in construction, efficient and reliable in operation, and one which produces accurate indications of inclination of the mobile object on which the device is mounted regardless of whether the object is inclined downward or upward. There is also provided a motion-transmitting mechanism embodying novel arrangement of the elements, whereby the effect of the force of acceleration is automatically compensated for, thus producing a true and accurate indication on the device in which the mechanism is embodied.

While only one embodiment of the invention has been illustrated and described, various other changes and modifications, which will now appear to those skilled in the art, may be made without departing from the scope of the invention. For example, the motion-transmitting mechanism may be embodied in various mechanical forms other than that shown in the drawings, and reference is therefore to be had to the appended claims for a definition of the limits of the invention.

What is claimed is:

1. In combination, a case, a pendulum pivotally mounted in said case, means operatively connected to said pendulum for indicating the angular displacement of said pendulum relative to said case, a frame, a gyroscope rotatably supported in said frame so that the latter can precess about an axis perpendicular to the axis of swing of the pendulum, and means connecting said pendulum and frame for causing said pendulum and frame to move simultaneously in relation to said case but in predetermined relation to each other, said last mentioned means including a connection for affecting the pendulum to a greater extent by the precessional movement of the gyroscope in one direction and to a lesser extent by the precessional movement of said gyroscope through the same angular distance in an opposite direction.

2. In an inclinometer for aircraft, the combination of a pendulous device arranged to be acted upon by acceleration forces as well as by the force of gravity when an aircraft on which the inclinometer is mounted is descending or ascending, gyroscopic means mounted to precess about an axis perpendicular to the axis of swing of the pendulous device for neutralizing or balancing said acceleration forces, means for transmitting the precessional forces of the gyroscope to the pendulous device including a pivotal connection between the gyroscope and the pendulous device arranged on a radial line extending normally from the axis of precession of the gyroscope at an angle less than ninety degrees from a horizontal plane passing through and including said axis of precession so that the angular displacement of the pendulous device with respect to the aircraft will be the same in descent as in ascent with the same angle of inclination of the aircraft, and means operatively connected with said pendulus device for indicating said angular displacements.

3. In an inclinometer for aircraft, the combination of a pendulous device arranged to be acted upon by acceleration forces as well as by the force of gravity when an aircraft on which the inclinometer is mounted is descending or ascending gyroscopic means arranged to precess about an axis for neutralizing or balancing said acceleration forces, means for transmitting the precessional forces of the gyroscope to the pendulous device including a pivotal connection between the gyroscope and the pendulous device arranged on a radial line extending normally from the axis of precession of the gyroscope at an angle less than ninety degrees above a horizontal plane passing through and including said axis of precession so that the angular displacement of the pendulous device with respect to the aircraft will be the same in descent as in ascent for the same angle of inclination of the aircraft, and means operatively connected with said pendulous device for indicating said angular displacements.

4. In an inclinometer for aircraft, the combination of a pendulous device arranged to be acted upon by acceleration forces as well as by the force of gravity when an aircraft on which the inclinometer is mounted is descending or ascending, gyroscopic means arranged to precess about an axis for neutralizing or balancing said acceleration forces, means for transmitting precessional forces of the gyroscope to the pendulous device including a link having one end thereof pivotally connected to the gyroscope on a radial line extending normally from the axis of precession of the gyroscope at an angle less than ninety degrees above a horizontal plane passing through and including said axis of precession and the other end pivotally connected to the pendulous device below said horizontal plane so that the pendulous device will be effected to a greater extent by the precession of said gyroscope in one direction and to a lesser extent by the precession of said gyroscope through the same angular distance in the opposite direction, thereby producing equal angular displacements of the pendulous device with respect to the aircraft in ascent and descent for the same angle of inclination of said aircraft, and means operatively connected with said pendulous device for indicating said angular displacements.

5. In an inclinometer for aircraft, the combination of a pendulous device arranged to be acted upon by acceleration forces as well as by the force of gravity when an aircraft on which the inclinometer is mounted is descending or ascending, gyroscopic means for neutralizing or balancing said acceleration forces including a rotor arranged for rotation about an axis, a frame supporting said rotor and arranged for angular movement about an axis perpendicular to the axis of rotation of said rotor so that it may be angularly displaced by the precession of the rotor produced on turning of the aircraft on which the inclinometer is mounted about a transverse axis, means for transmitting the precessional movements of the gyroscope to the pendulous device including a plate secured to said gyroscope frame, and a link having one end thereof pivotally connected to said plate on a radial line extending normally from the axis of precession of the gyroscope at an angle less than ninety degrees above a horizontal plane passing through and including said axis of precession and the other end pivotally connected to the pendulous device below said horizontal plane so that the pendulous device will be affected to a greater extent by the precession of said gyroscope in one direction and to a lesser extent by the precession of said gyroscope through the same angular distance in an opposite direction, thereby producing equal angular displacements of said pendulous device with respect to the aircraft in descent and ascent for the same angle of inclination of said aircraft, and means operatively connected to said pendulous device for indicating said angular displacements.

6. In combination, a pendulum, means mounting said pendulum to swing about an axis, a gyroscope, means mounting said gyroscope for precession about an axis at an angle to the axis of the pendulum, and means connecting said pendulum and said gyroscope mounting means for causing them to move simultaneously in predetermined relation to each other, said last-named means including a connection for affecting the pendulum to a greater extent by a precessional movement of the gyroscope in one direction and to a lesser extent by a precessional movement of the gyroscope through the same angular distance in an opposite direction.

PHILIP WEBER.